(12) United States Patent
Zhu

(10) Patent No.: US 12,130,142 B2
(45) Date of Patent: Oct. 29, 2024

(54) DYNAMIC PARAMETER SERVER FOR AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 244 days.

(21) Appl. No.: 16/875,739

(22) Filed: May 15, 2020

(65) Prior Publication Data

US 2021/0356961 A1    Nov. 18, 2021

(51) Int. Cl.
*G01C 21/30* (2006.01)
*G05D 1/00* (2024.01)

(52) U.S. Cl.
CPC ........... *G01C 21/30* (2013.01); *G05D 1/0088* (2013.01); *G05D 1/0212* (2013.01); *G05D 1/0246* (2013.01); *G05D 1/0257* (2013.01); *G05D 1/0274* (2013.01); *G05D 1/0278* (2013.01); *G06T 2207/20104* (2013.01)

(58) Field of Classification Search
CPC .. G01C 21/30; G01C 21/387; G01C 21/3889; G05D 1/0088; G05D 1/0212; G05D 1/0246; G05D 1/0257; G05D 1/0274; G05D 1/0278; G05D 2201/0213; G06T 2207/20104; G06V 10/25
See application file for complete search history.

(56) References Cited

U.S. PATENT DOCUMENTS

| 2008/0071466 A1* | 3/2008 | Downs | G08G 1/0104 |
| | | | 701/117 |
| 2010/0036595 A1* | 2/2010 | Coy | G08G 1/0104 |
| | | | 701/119 |

(Continued)

FOREIGN PATENT DOCUMENTS

| CN | 105946865 A | 9/2016 |
| CN | 106557344 A | 4/2017 |

(Continued)

OTHER PUBLICATIONS

Takeuchi et al., Blind Area Traffic Prediction using High Definition Maps and LiDAR for Safe Diving Assist, 2015 IEEE 18th International Conference on Intelligent Transportation Systems, Sep. 15, 2015, pp. 2311-2316, Nagoya University, Japan.

*Primary Examiner* — Jason Holloway
*Assistant Examiner* — Blake A Wood
(74) *Attorney, Agent, or Firm* — WOMBLE BOND DICKINSON (US) LLP

(57) ABSTRACT

According to one embodiment, a dynamic parameter server is provided in an ADV to update parameters of an autonomous driving system (ADS) of the ADV in real time without requiring the reboot of the ADS. The dynamic parameter server can obtain new parameters from a configuration file created by users based on their experiences and expectations. Each new parameter is mapped to certain physical conditions. When the ADV encounters the physical conditions mapped to a particular parameter, the dynamic parameter server can broadcast the new parameters to the ADS, (Continued)

which can use the new parameters to control the ADV. The physical conditions can be used as selection factors for the dynamic parameter to determine which ADS parameter to update.

20 Claims, 10 Drawing Sheets

(56) References Cited

U.S. PATENT DOCUMENTS

| | | | |
|---|---|---|---|
| 2016/0214596 A1* | 7/2016 | Glugla | B60W 30/188 |
| 2017/0090896 A1* | 3/2017 | Lin | G06F 8/61 |
| 2017/0185089 A1* | 6/2017 | Mei | G05D 1/0257 |
| 2018/0188742 A1 | 7/2018 | Wheeler | |
| 2018/0348775 A1 | 12/2018 | Yu et al. | |
| 2019/0204092 A1 | 7/2019 | Wheeler | |
| 2019/0317509 A1 | 10/2019 | Zhang et al. | |
| 2019/0323855 A1 | 10/2019 | Mahler et al. | |
| 2020/0372263 A1* | 11/2020 | Song | G05D 1/0251 |
| 2021/0291607 A1* | 9/2021 | Akai | B60G 17/08 |

FOREIGN PATENT DOCUMENTS

| | | |
|---|---|---|
| CN | 107640159 A | 1/2018 |
| CN | 108375775 A | 8/2018 |
| CN | 109466563 A | 3/2019 |
| CN | 109753055 A | 5/2019 |
| CN | 109935077 A | 6/2019 |
| WO | 2020031652 A1 | 2/2020 |

\* cited by examiner

DYNAMIC PARAMETER SERVER FOR AUTONOMOUS DRIVING VEHICLES

TECHNICAL FIELD

Embodiments of the present disclosure relate generally to operating autonomous driving vehicles. More particularly, embodiments of the disclosure relate to a method of dynamically overwriting some default parameters of an autonomous driving system of an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An autonomous driving vehicle (ADV) can use hardware sensors to perceive the driving environment, and use sensor data coupled with a high definition (HD) map for path planning. An ADV may also include a number of software modules to process sensor data and map information, generate paths, and control the operation of the ADV.

Each software module can have a set of default parameters. However, these default parameters are not optimal for all HD maps, or different regions within the same HD map. Although default parameters of each software module can be directly modified manually by a user, such direct modification is not only time-consuming but also requires a reboot of the software modules, which may interrupt the normal operation of the ADV.

Default parameters of each software module may also be modified programmatically by the ADV in real-time based on driving conditions of the ADV. This approach is also problematic. One of the disadvantages for this approach is that the programmatically modified parameters may not always ideal for an HD map. Another disadvantage is that sometimes the ADV cannot detect certain physical conditions (e.g., a gentle slope on the road), and the slope information may not be available by the HD map either. As a result, the ADV may not be able to use such information to programmatically modify certain default parameters.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
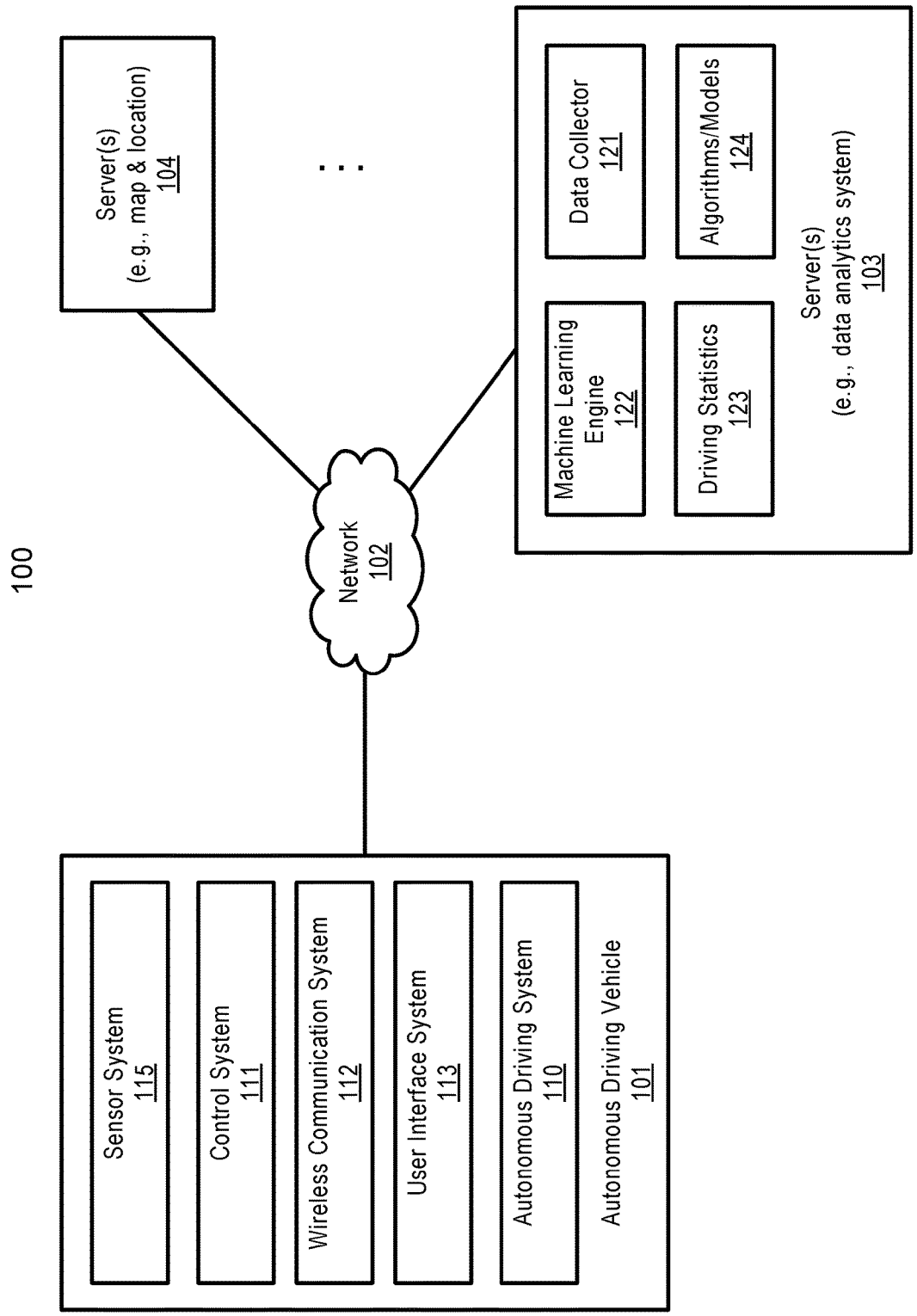
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a dynamic parameter server is provided in an ADV to update parameters of an autonomous driving system (ADS) of the ADV in real time without requiring the reboot of the ADS. The dynamic parameter server can obtain new parameters from a configuration file created by users based on their experiences and expectations. Each new parameter is mapped to certain physical conditions. When the ADV encounters the physical conditions mapped to a particular parameter, the dynamic parameter server can broadcast the new parameters to the ADS, which can use the new parameters to control the ADV. The physical conditions can be used as selection factors for the dynamic parameter to determine which ADS parameter to update.

According to an exemplary method, before the ADV is to enter a particular region on a high definition (HD) map, the dynamic parameter server identifies one or more parameters from a data structure based on one or more selection factors related to the particular region, each identified parameter corresponding to a parameter of an autonomous driving module in the ADS. The dynamic parameter server broadcasts the one or more identified parameters via an internet hub to each autonomous driving module in the ADS, which can update one or more corresponding default parameters of the ADS with the one or more identified parameters. Thereafter, when driving across the particular region, the ADS uses the updated parameters to operate the ADV until the parameters gets updated again.

In one embodiment, the selection factors can include one or more of a map ID, a road ID, a lane ID, and a GPS barrier. A GPS barrier as used herein refers to a region determined by GPS absolute coordinates; it typically is a rectangle but can be any shape.

In one embodiment, the one or more identified parameters can be values predetermined by users. A user can create a configuration file with the desired parameters and place the configuration file at a particular folder or director in a computing device of the ADV. From the particular folder or directory, the dynamic parameter server can pick up the configuration file and load it into a searchable data structure, such as a table. The identified parameters can include one or more of an obstacle to be trimmed from a region of interest (ROI), a floating obstacle to be trimmed from the HD map, a speed limit, slope information, or a weight of a cost function for the planning module of the ADS.

In one embodiment, the dynamic parameter server can additionally identify one or more parameters that is not related to any geographic region for updating corresponding default parameters of the ADS. For example, the dynamic parameter server can receive information about the load of the ADV, and broadcast the load information to the ADS, which uses the load information as an input to a control module if the ADS. The control module can use the load information to adjust brake commands and/or throttle commands to maintain a constant acceleration/deceleration for the ADV.

In one embodiment, the data structure can be a table, and can include entries of mapping between one or more selection factors and a parameter of the ADS. The data structure can be updated with information from a configuration file at a predetermined location in response to the dynamic parameter server being rebooted.

In one embodiment, the dynamic parameter server is a separate software module from each autonomous driving module of the ADS, and communicates with the autonomous driving module via an internet hub. The dynamic parameter server broadcast each of the one or more identified parameters via the internet hub to each module in the ADS.

The above summary does not include an exhaustive list of all embodiments in this disclosure. All methods described above can be practiced from all suitable combinations of the various aspects and embodiments described in the disclosure.

Autonomous Driving Vehicle

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
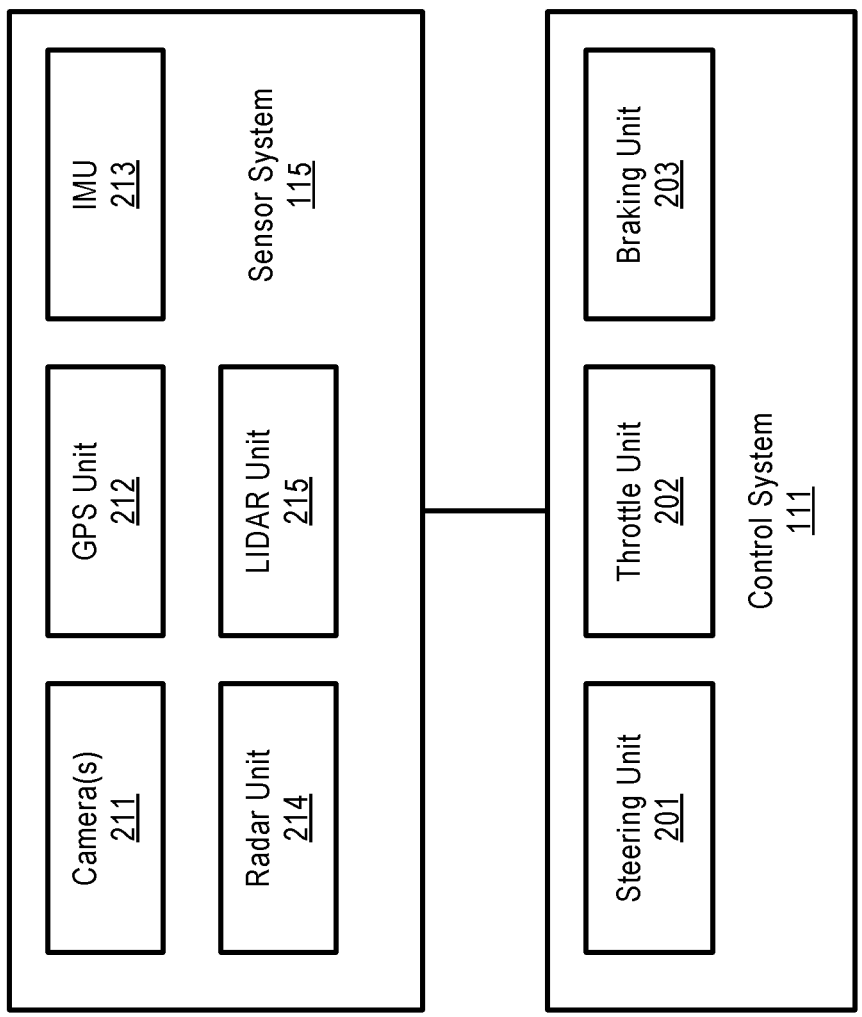
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle.

Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
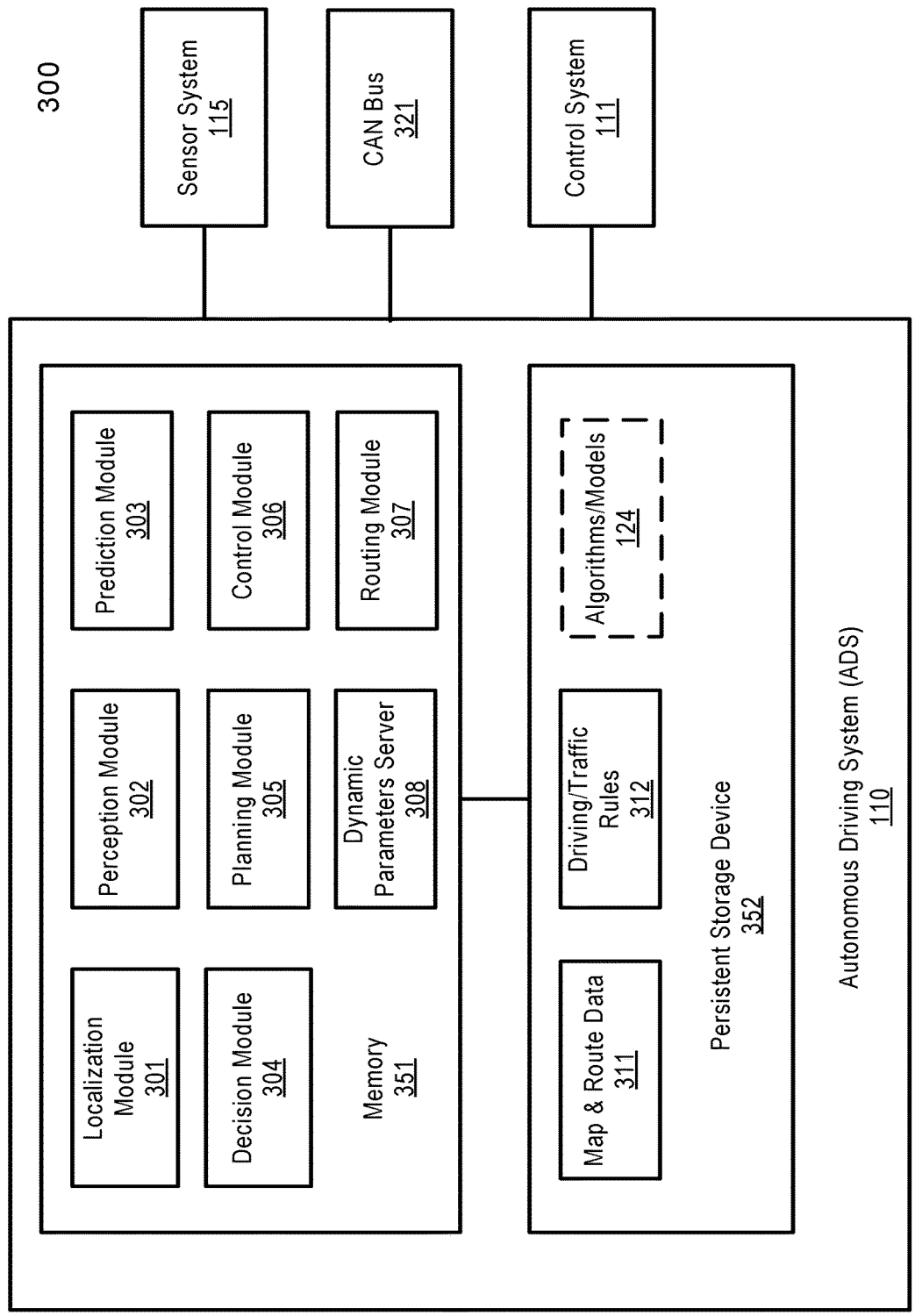
FIGS. 3A-3B are block diagrams illustrating an example of an autonomous driving system used with an autonomous driving vehicle according to one embodiment.
Figure 3B:
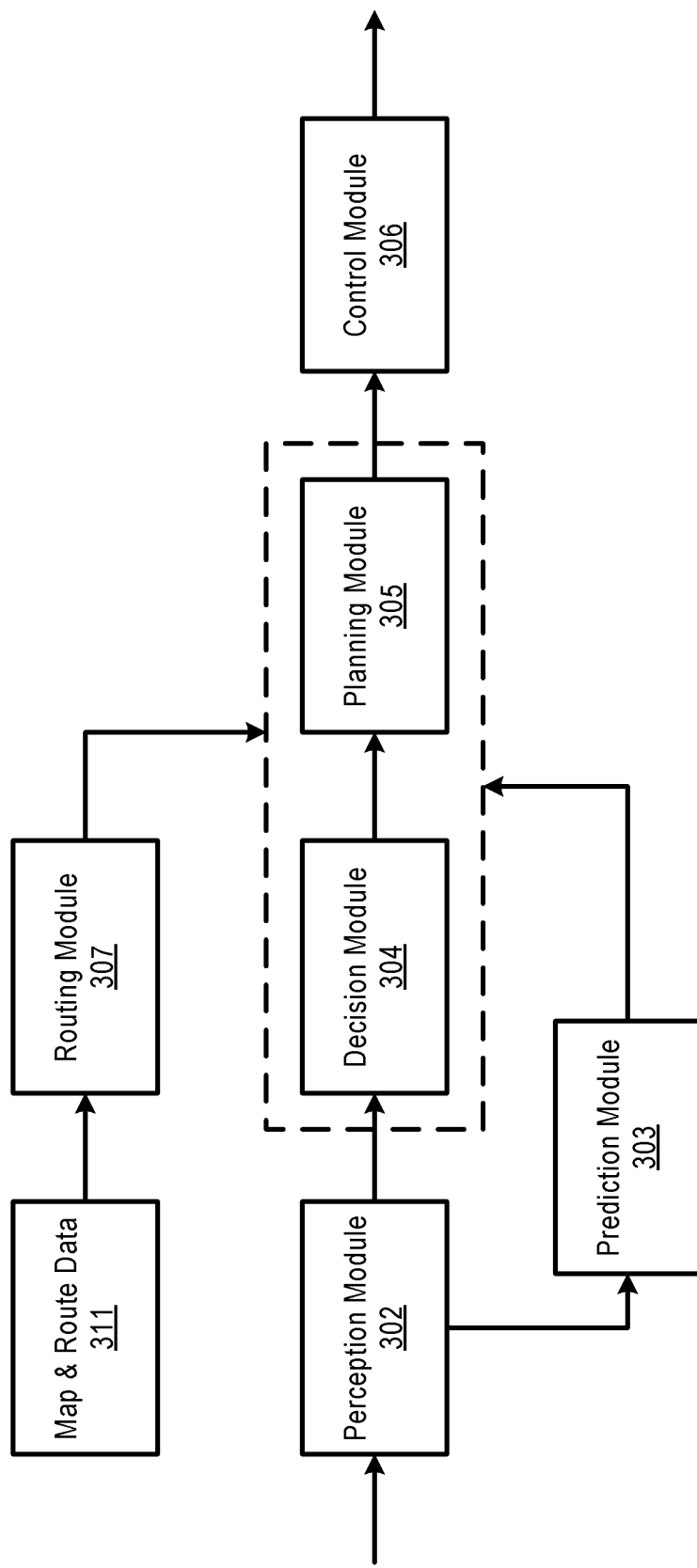

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and dynamic parameter sever 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map and route data 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains map and route data 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111 control system 111 via a CAN bus 321, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

The dynamic parameter server 308 can be a software module in the ADS 110 that can be used to update parameters of the ADS 110 without requiring the reboot of the ADS. The dynamic parameter server can obtain new parameters from a configuration file created by users based on their experiences and expectations. When the ADV 101 operating in an autonomous driving mode encounters physical conditions mapped to a particular parameter, the dynamic parameter server can broadcast the new parameters to the ADS, which can use the new parameters to control the ADV.

Dynamic Parameter Server

Figure 4:
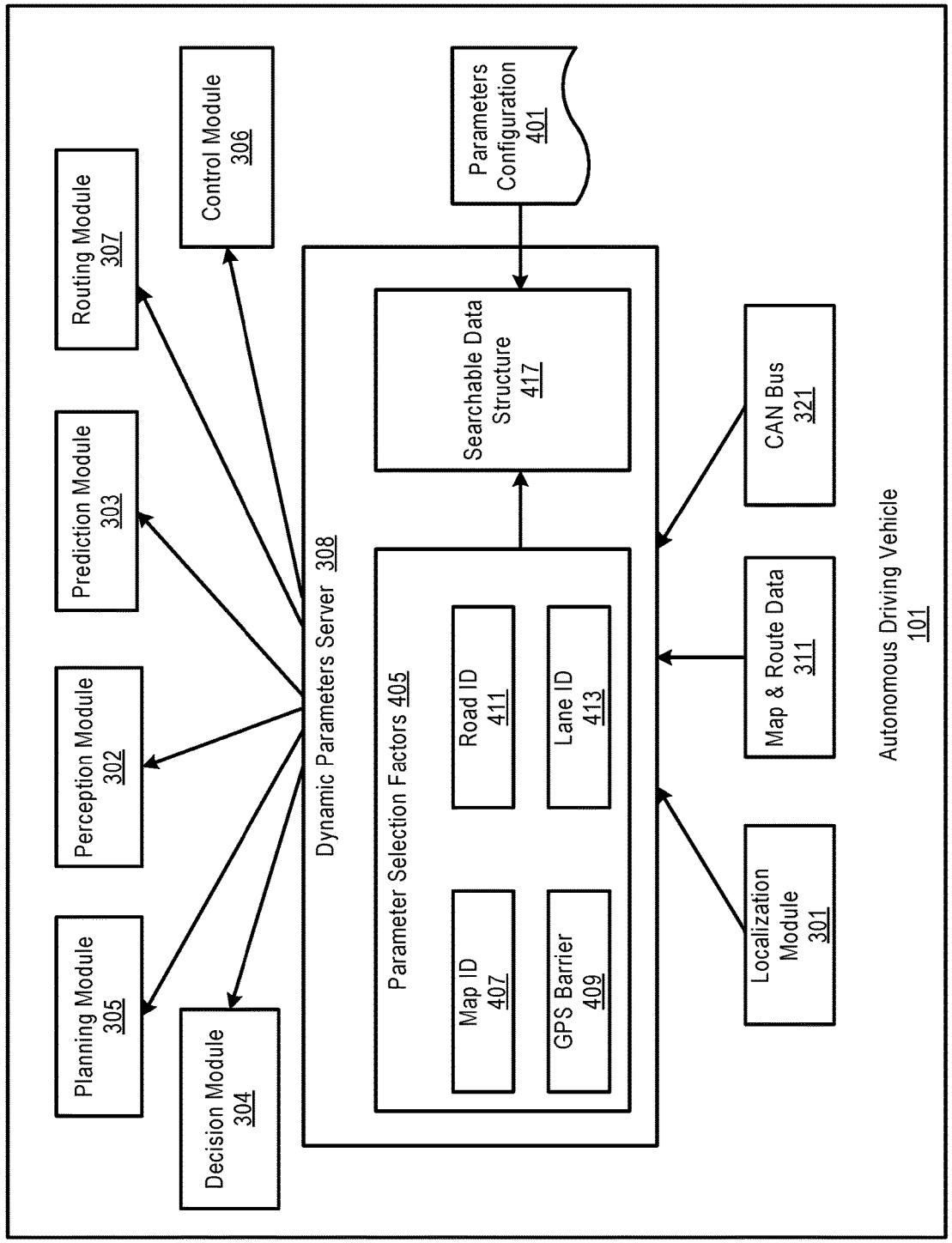
FIG. 4 is a block diagram illustrating an example of a system for dynamically updating parameters of an ADS in an ADV according to one embodiment.

FIG. 4 is a block diagram illustrating an example of a system for dynamically updating parameters of an ADS in an ADV according to one embodiment.

As shown in FIG. 4, a dynamic parameter server 308 can be provided as a separate entity from each autonomous driving module in the ADS. The dynamic parameter server 308 can take input from the localization module 301, the map and route data component 311, and the Can bus component 321.

From the map and route data component 311, the dynamic parameter server can determine an ID of a lane 413 that the ADV 101 is currently taking, an ID of a road 411 that includes the lane, and an ID of a HD map 407 corresponding to the area on which the ADV 101 is travelling. From the localization module 301, the dynamic parameter server 308 can take a GPS barrier 409.

The input to the dynamic parameter server 308 from the localization module 301 and the map and route data component 311 can be used as selection factors to select new ADS parameters to update default parameters of the ADS 110. Some of the selection factors are related to a particular geographic region on a HD map, and are used to indicate a location of a vehicle on the HD map, for example, the lane ID, while some others are related to sensor data, for example, a GPS barrier 409, which is a boundary formed by absolute GPS coordinates on a HD map.

In one embodiment, the dynamic parameter server 308 includes a data structure 417 loaded with mappings between ADS parameters and selection factors 405. The data structure 417 can be any searchable entity, for example, a table. The searchable data structure 417 can be populated with information from a parameters configuration document 401, which can be edited by a user manually or via a user interface or via a tool. Examples of the parameters configuration document is a JavaScript Object Notion (JSON) file, or a Hypertext Markup Language (HTML) file.

In one embodiment, data in the data structure 417 can be structured in a way that allows the dynamic parameter server 308 to obtain a different set of ADS parameters for each unique combination of the selection factors 405.

For example, when the ADV 101 is traveling on an HD map A, the dynamic parameter server 308 can obtain the ID of HD map A from the map and route data 311, and use the map ID to obtain a set of ADS parameters for the map from the data structure 417. As the ADV 101 enters road A on HD map A, a different set of ADS parameters for the road can be obtained from the data structure 417. Similarly, as the ADV 101 enters lane A in road A, another set of ADS parameters can be obtained from the data structure 417. Further, depending on whether the ADV 101 is within a GPS barrier or not, the dynamic parameter server 308 can have a different set of optimal parameters for the ADS.

In one embodiment, once a set of ADS parameters is identified from the data structure 417 based on the location of the ADV 101, the dynamic parameter server 308 can broadcast the ADS parameters via a network. Each of a number of autonomous driving modules 302-307 can receive the set of ADS parameters broadcast via the network. If an AD has a corresponding ADS parameter, the default value of the corresponding ADS parameter can be updated with the received value. Thereafter and before the ADS parameter is updated again with a new value received from the dynamic parameter server 308, the ADS 110 would use the updated parameter to operate the ADV 101.

Figure 5:
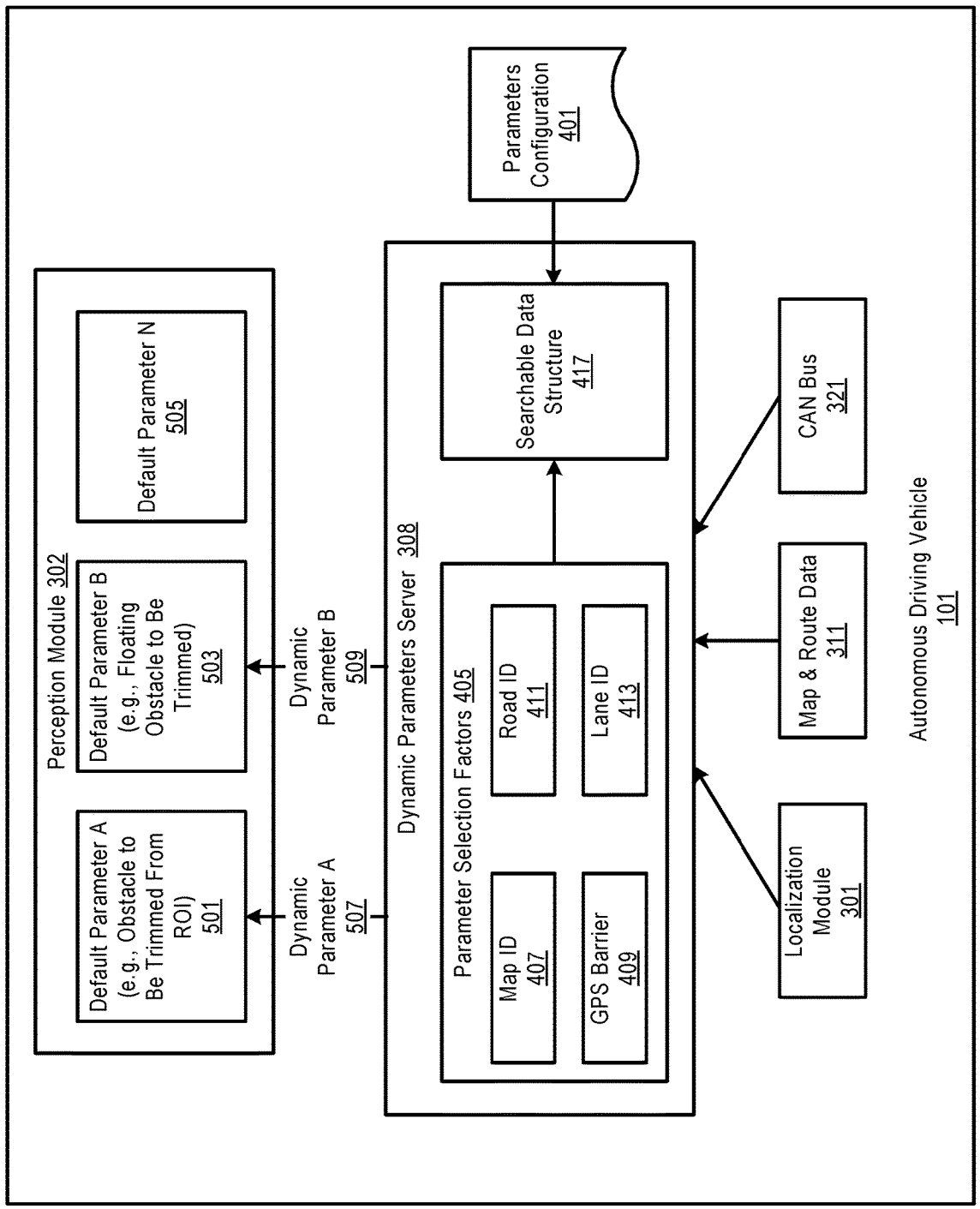
FIG. 5 is a block diagram further illustrating an example of a system for dynamically updating parameters of an ADS in an ADV according to one embodiment.

FIG. 5 is a block diagram further illustrating an example of a system for dynamically updating parameters of an ADS in an ADV according to one embodiment.

Specifically, this figure illustrates that the dynamic parameter server 308 identifies a set of parameters for updating default parameters of the perception module 302. As shown in FIG. 5, the perception module 302 can include a number of parameters. Although the figure only shows three parameters, default parameter A 501, default parameter B 503, and default parameter N 505, the perception module 302 may include one or more other default parameters.

In one embodiment, default parameter A 501 can represent an obstacle to be trimmed from a region of interest (ROI) for the ADV 101. An ROI is a perception area for the ADV 101, and obstacles outside the ROI tends to be ignored by the ADV 101. An ROI for the perception module 302 can be saved in the map and route data component 311, and can be constantly regenerated as the ADV 101 is travelling in an area corresponding to an HD map.

Dynamic parameter A 507 identified by the dynamic parameter server 308 can be an obstacle (e.g., a trash bin on the roadside) on the HD map that is known by a user to be within the ROI of the ADV 101. The user may know this from his past experiences or from the HD map.

While the ADV 101 in motion, the perception module 302, upon receiving information (e.g., location information such as map ID, road ID, etc.) for the trash bin, can exclude the trash bin from the ROI of the existing map without regenerating the part of the map corresponding to the area that includes the obstacle.

Default parameter A 501 may be frequently updated with different obstacles on the right side of the ADV as opposed to the left side, because the road curb on the right side tends to have more obstacles. Accordingly, many obstacles on the left side would be trimmed from the ROI of the ADV 101.

In one embodiment, default parameter B 503 can be a floating obstacle that needs to be trimmed from a particular region on an HD map. One example of a floating obstacle is a bunch of hanging willow branches. If a region is known to have hanging willow branches based on the HD map, the region can be marked by a GPS barrier or a lane ID in the parameters configuration document 401, which can be and loaded into the data structure 417.

The dynamic parameter server 308, upon detecting that the ADV 101 is about to enter the marked region, can identify the marked region based on data from the localization module 301 and/or the map and route data component 311, and broadcast dynamic parameter B 509 as represented by the identifying information for the hanging willow branches to the perception module 302. The perception module 302 can would ignore the hanging willow branches, for example, by filtering out the hanging willow branches from the ROI.

In one embodiment, the perception module 302 may include one or more default parameters, e.g., default parameter N 505, that are not to be updated by the dynamic parameter server 308. Further, an updated parameter of any AD module in the ADS 110 can be used by the ADS 110 for as long as the physical conditions related to the dynamic parameter exist. Once the ADV 101 passes the physical conditions, the ADS 110 would revert the updated parameter back to the default value. By default, the perception module 302 would not trim any obstacle from the ROI, or ignore any floating obstacle from a particular region on the HD map.

Figure 6:
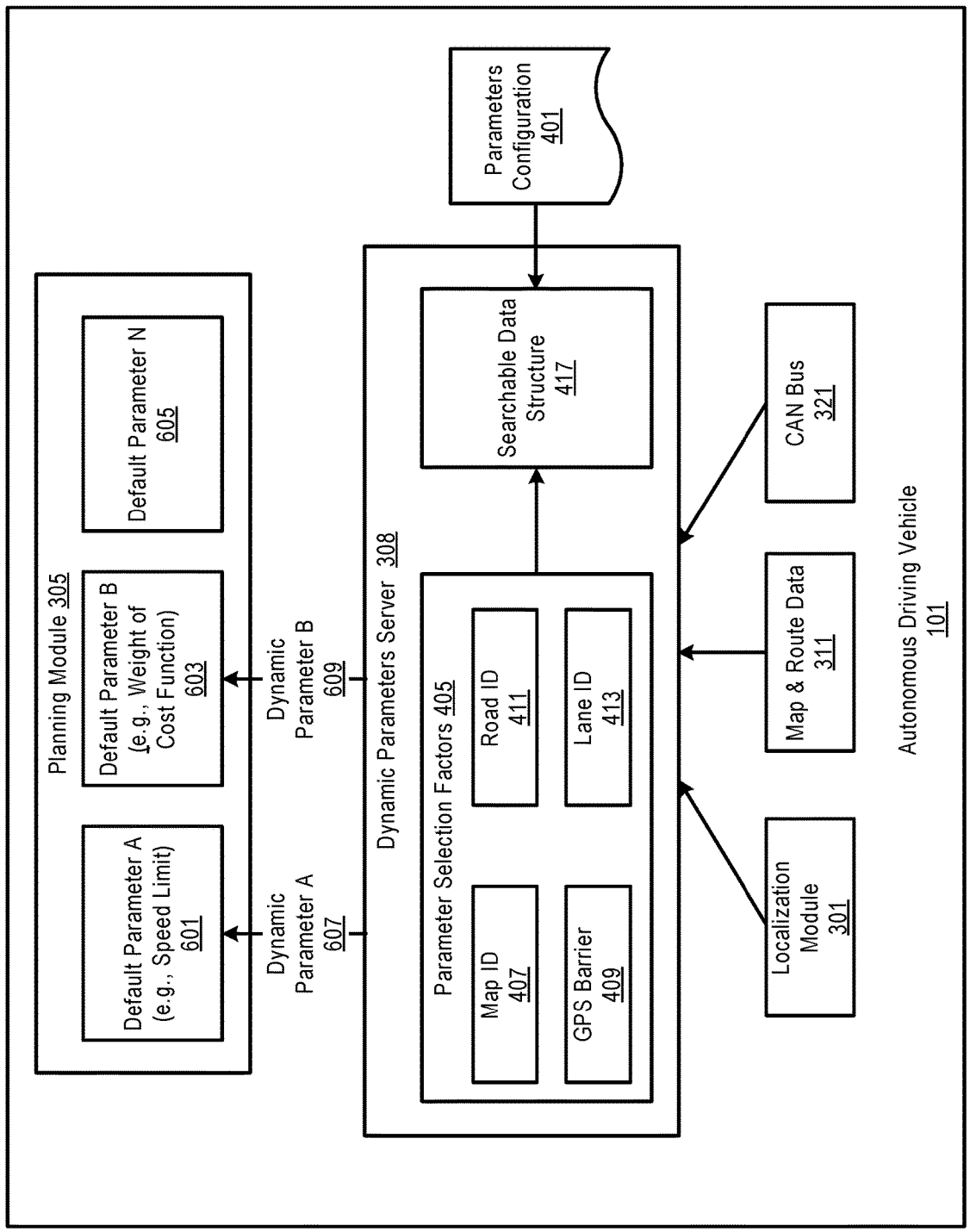
FIG. 6 is a block diagram further illustrating an example of a system for dynamically updating parameters of an autonomous driving system in an ADV according to one embodiment.

FIG. 6 is a block diagram further illustrating an example of a system for dynamically updating parameters of an autonomous driving system in an ADV according to one embodiment. Specifically, this figure illustrates that the dynamic parameter server 308 identifies a set of parameters for updating default parameters of the planning module 305.

As shown in FIG. 6, the planning module 305 can include a number of default parameters. Although the figure shows three default parameters, default parameter A 601, default parameter B 603, and default parameter N 605, the planning module 305 may include one or more additional default parameters.

Default parameter A 601 can represent a posted speed limit on a roadside. However, driving at a posted speed limit may not always ideal. For example, on a road with a posted speed limit of 35 mph, if human driving experiences shows that the traffic is light in the evening and congested in the daytime, the ADV 101 may adjust its speed limit to drive faster than the posted speed limit in the evening, and drive slower than the posted speed limit in the daytime. The adjusted speed limit as represented by dynamic parameter A 607 can be broadcast by the dynamic parameter server 308 to the planning module 305.

Default parameter B 603 can be a weight of a cost function. The planning module 305 may select the optimal path from a number of passible paths from point A to point using a cost function, which may encode traffic rules and road conditions. A cost function may have different weight parameters that can be adjusted based on experiences and/or driving statistics. The weight of a particular factor of the cost function may be different for one region of a map from the weight of the factor for another region of the map. Based on where the ADV 101 is driving, one or more weight factors of a cost function used by the planning module 305 may be adjusted by a user based on experiences.

When the ADV 101 enters a particular region, the dynamic parameter server 308 may identify a weight (represented by dynamic parameter B 609) of a particular factor of the cost function, and broadcast the weight to the network, for use by the planning module 305.

Figure 7:
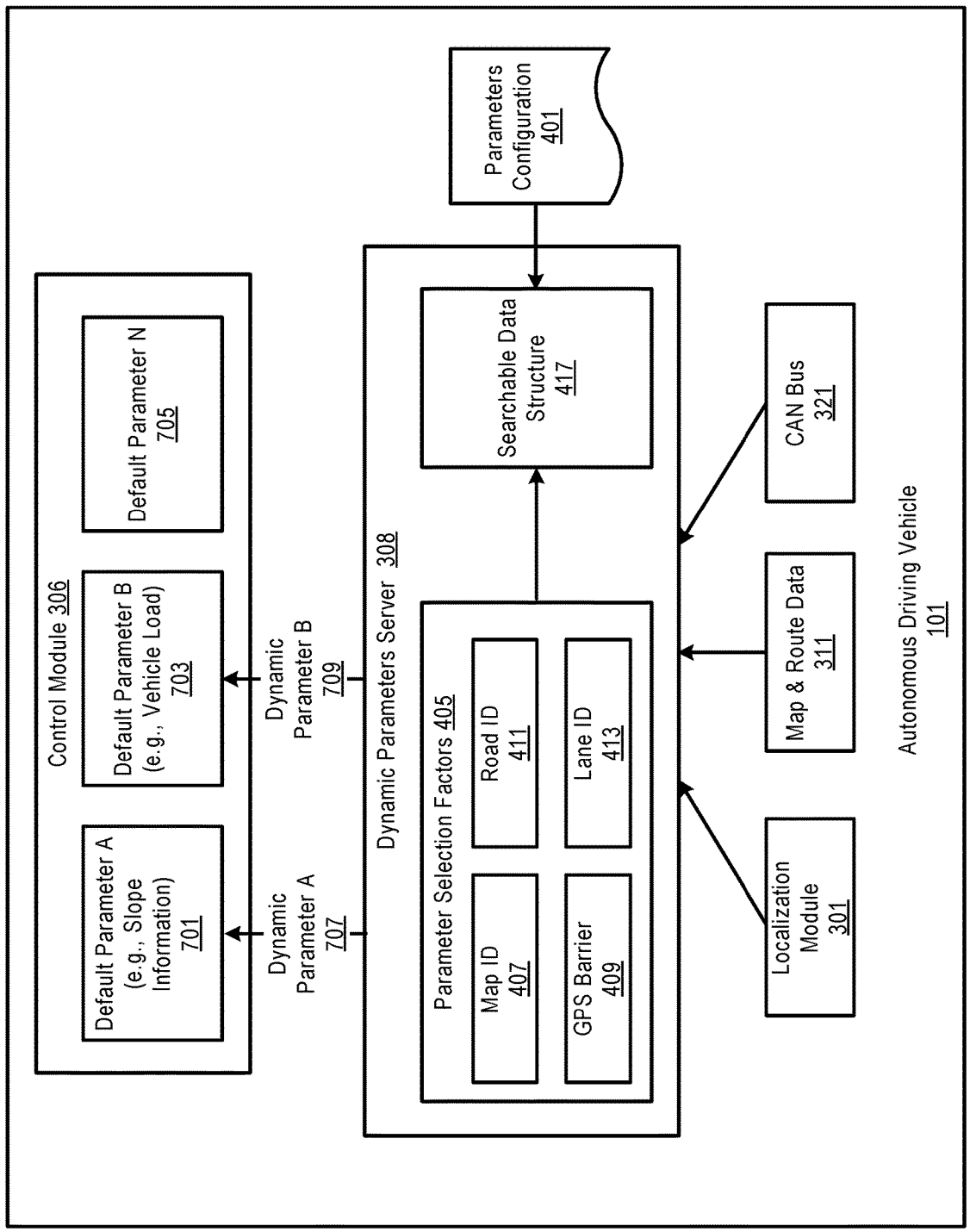
FIG. 7 is a block diagram further illustrating an example of a system for dynamically updating parameters of an ADS in an ADV according to one embodiment.

FIG. 7 is a block diagram further illustrating an example of a system for dynamically updating parameters of an ADS in an ADV according to one embodiment.

Specifically, this figure illustrates that the dynamic parameter server 308 identifies a set of parameters for updating one or more default parameters of the control module 306.

As shown in FIG. 7, the control module 306 can include a number of default parameters. Although the figure shows three parameters, default parameter A 701, default parameter B 703, and default parameter N 705, the control module 306 may include one or more other default parameters.

In one embodiment, default parameter A 701 may represent slope information of a particular region on an HD map. The slope information typically is not included in an HD map, and also is not easily detected by sensors, particularly when the slope is not that steep. A user, on the other hand, would be able to tell the presence of such a slope from his experiences in driving across the slope.

Identifiers of the slope (e.g., a map ID, a road ID, and/or a GPS barrier) may be associated with the region where the slope is located. The association may be put in the parameters configuration file 401. When the ADV 101 is to get on the slope, the slope information as represented by dynamic parameter A 707 may be obtained by the dynamic parameter server 308 and broadcast to the control module 306, which may use the slope information to adjust a throttle and/or brake command to compensate for the gravity changes associated with the slope.

In one embodiment, default parameter B 704 may be vehicle load information that may has a default value being the weight of the AVD 101. When the load of the ADV 101 changes, for example, due to additional passenger in the vehicle, a weight sensor in the ADV 101 can sense the weight changes, and send the weight to the CAN bus 321. The dynamic parameter server 308 can obtain the load information from the CAN bus 321, and broadcast the information represented by dynamic parameter B 709 to the control module 306. The control module 306 can use the load information to adjust a brake command or a throttle command of the ADV to maintain a same deceleration or acceleration.

Unlike the other dynamic parameters described in the disclosure, the vehicle load information is not specified by a user based on his experiences. Instead, the load information is dynamically generated by a weight sensor in real time.

Figure 8:
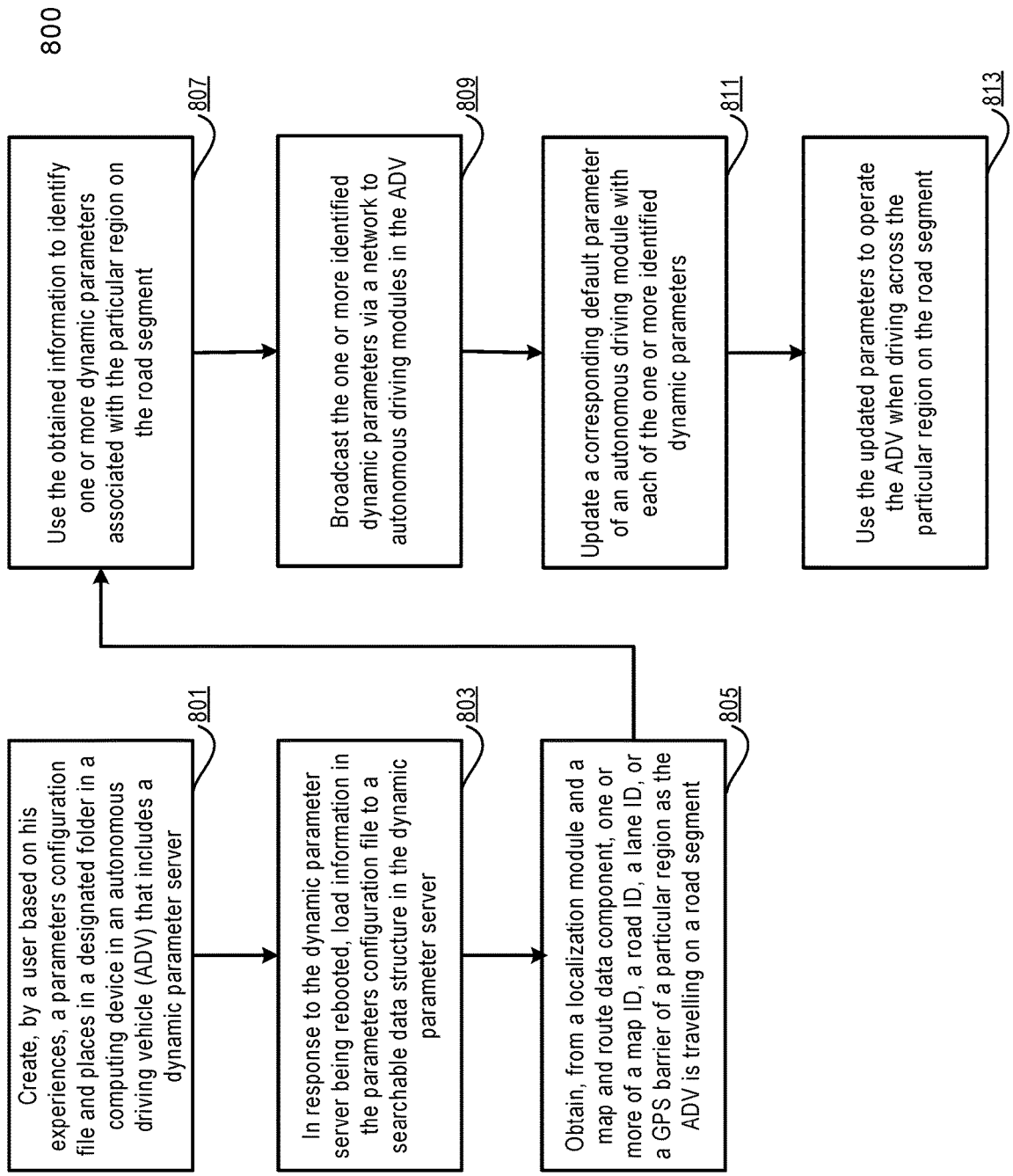
FIG. 8 is a flow diagram illustrating a process of dynamically updating parameters of an ADS in an ADV according to one embodiment.

FIG. 8 is a flow diagram illustrating a process 800 of dynamically updating parameters of an ADS in an ADV according to one embodiment. Process 800 may be performed by processing logic which may include software, hardware, or a combination thereof.

Referring to FIG. 8, in operation 801, a user creates a parameters configuration file based on his experiences, and places the file in a designated folder in a computing device in an autonomous driving vehicle (ADV), which includes a dynamic parameter server. In operation 803, the dynamic parameter server, when rebooted, loads information in the parameters configuration file to a searchable data structure in the dynamic parameter server.

In operation 805, the dynamic parameter server obtains, from a localization module and a map and a route data component, one or more of a map ID, a road ID, a lane ID, or a GPS barrier of a particular region as the ADV is travelling on a road segment. In operation 807, the dynamic parameter server uses the information from the localization module and a map and route data component to identify one or more dynamic parameters associated with the particular region on the road segment.

In operation 809, the dynamic parameter server broadcasts the one or more identified dynamic parameters via a network to autonomous driving modules in the ADV. In operation 811, one or more autonomous driving modules in the ADS updates a corresponding default parameter with each of the one or more identified dynamic parameters. In operation 813, the ADS uses the updated parameters to operate the ADV when driving across the particular region on the road segment.

Figure 9:
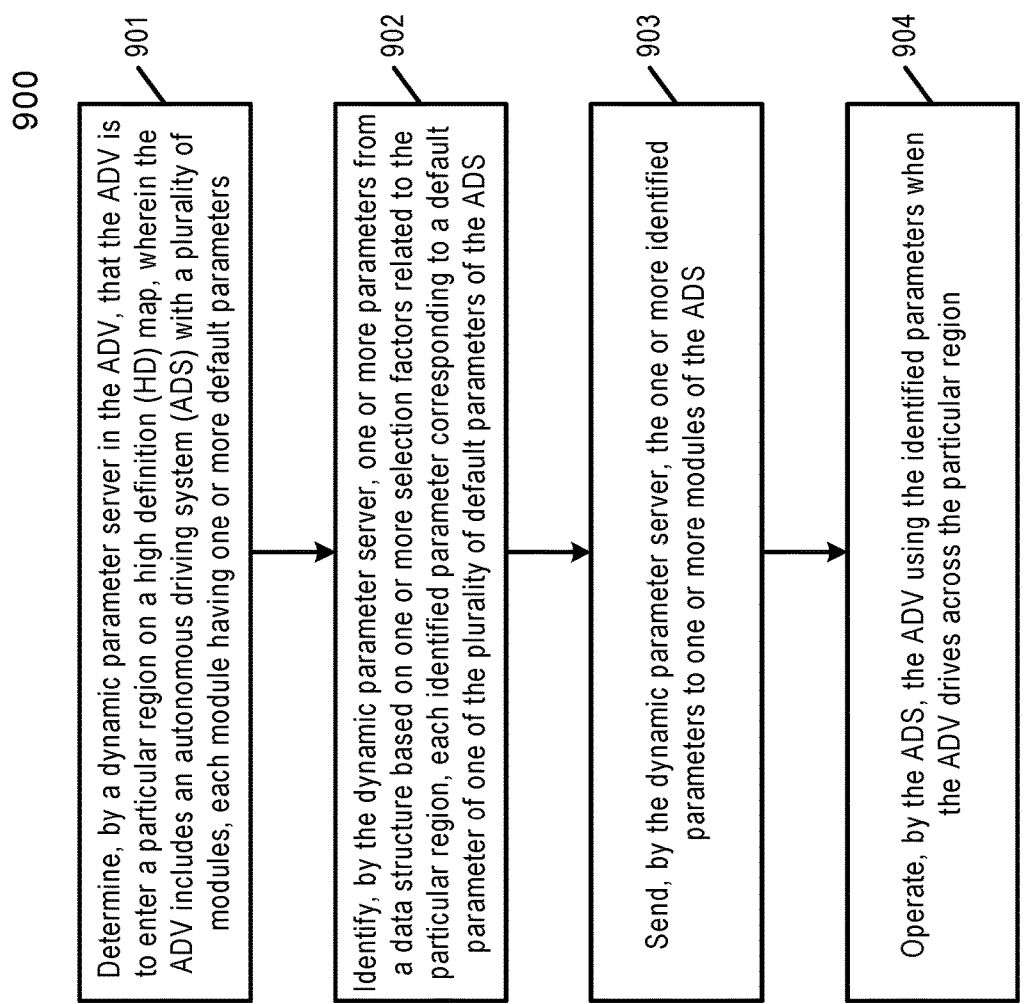
FIG. 9 is a flow diagram illustrating another process of dynamically updating parameters of an ADS in an ADV according to one embodiment.

FIG. 9 is a flow diagram illustrating a process 900 of dynamically updating parameters of an ADS in an ADV according to one embodiment. Process 900 may be performed by processing logic which may include software, hardware, or a combination thereof. For example, process 900 may be performed by the dynamic parameter server 308 described in FIGS. 4-7 or the ADS 110 as described in FIGS. 3A-3B.

Referring to FIG. 9, in operation 901, the processing logic determines that the ADV is to enter a particular region on a high definition (HD) map. The ADV includes an autonomous driving system (ADS) with a plurality of modules, each module having one or more default parameters. In operation 902, the processing logic identifies one or more parameters from a data structure based on one or more selection factors related to the particular region, each identified parameter corresponding to a default parameter of one of the plurality of default parameters of the ADS. In operation 903, the processing logic sends the one or more identified parameters to one or more modules of the ADS. In operation 904, the processing logic operates the ADV using the identified parameters when the ADV drives across the particular region.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of dynamically updating parameters of an autonomous driving system in an autonomous driving vehicle (ADV), comprising:
   determining, by a dynamic parameter server in the ADV, that the ADV is to enter a particular region on a high definition (HD) map, wherein the ADV includes an autonomous driving system (ADS) with a plurality of modules, each module having one or more default parameters;
   identifying, by the dynamic parameter server, one or more parameters from a data structure based on one or more selection factors related to the particular region, each identified parameter corresponding to a default parameter of one of the plurality of modules of the ADS;
   sending, by the dynamic parameter server, the one or more identified parameters to one or more modules of the ADS to update the one or more default parameters of the ADS with the one or more identified parameters, wherein the one or more default parameters of the ADS include a first default parameter representing slope information of the particular region on the HD map, wherein the one or more default parameters of the ADS include a second default parameter representing one or more obstacles that need to be trimmed from a region of interest (ROI), wherein the one or more default parameters of the ADS include a third default parameter representing one or more floating obstacles that need to be trimmed from the HD map, wherein the one or more default parameters of the ADS include a fourth default parameter representing a posted speed limit on a roadside, wherein a speed limit of the ADV is adjusted based on driving experience and the posted speed limit, wherein when the driving experience shows that a traffic is light in nighttime and congested in daytime, the speed limit of the ADV is adjusted for the ADV to drive faster than the posted speed limit in the nighttime, and the speed limit of the ADV is adjusted for the ADV to drive slower than the posted speed limit in the daytime, wherein the adjusted speed limit is broadcast by the dynamic parameter server; and
   operating, by the ADS, the ADV using the one or more identified parameters when the ADV drives across the particular region.

2. The method of claim 1, wherein the one or more selection factors includes a map identifier of the HD map, a road ID, a lane ID, or a GPS barrier at the particular region.

3. The method of claim 1, wherein the one or more identified parameters include one or more of the one or more obstacles to be trimmed from the ROI, the one or more floating obstacles to be trimmed from the HD map, the speed limit, the slope information, or a weight of a cost function for the ADS.

4. The method of claim 1, wherein the dynamic parameter server further sends load information of the ADV to the ADS, which uses the load information to adjust a brake command or a throttle command of the ADV to maintain a same deceleration or acceleration.

5. The method of claim 1, wherein the data structure includes a plurality of entries, each entry representing a matching between one or more selection factors and a parameter of the ADS.

6. The method of claim 5, wherein the data structure is updated with information from a configuration file at a predetermined location of the particular region in response to the dynamic parameter server being rebooted.

7. The method of claim 1, wherein the dynamic parameter server is a separate software module from each autonomous driving module of the ADS, and communicates with the autonomous driving module via an internet hub.

8. The method of claim 7, wherein the dynamic parameter server broadcasts each of the one or more identified parameters via the internet hub to each module in the ADS.

9. A non-transitory machine-readable medium having instructions stored therein for dynamically updating parameters of an autonomous driving system in an autonomous driving vehicle (ADV), which instructions when executed by a processor, cause the processor to perform operations, the operations comprising:
   determining, by a dynamic parameter server in the ADV, that the ADV is to enter a particular region on a high definition (HD) map, wherein the ADV includes an autonomous driving system (ADS) with a plurality of modules, each module having one or more default parameters;
   identifying, by the dynamic parameter server, one or more parameters from a data structure based on one or more selection factors related to the particular region, each identified parameter corresponding to a default parameter of one of the plurality of modules of the ADS;
   sending, by the dynamic parameter server, the one or more identified parameters to one or more modules of the ADS to update the one or more default parameters of the ADS with the one or more identified parameters, wherein the one or more default parameters of the ADS include a first default parameter representing slope information of the particular region on the HD map, wherein the one or more default parameters of the ADS include a second default parameter representing one or more obstacles that need to be trimmed from a region of interest (ROI), wherein the one or more default parameters of the ADS include a third default parameter representing one or more floating obstacles that need to be trimmed from the HD map, wherein the one or more default parameters of the ADS include a fourth default parameter representing a posted speed limit on a roadside, wherein a speed limit of the ADV is adjusted based on driving experience and the posted speed limit, wherein when the driving experience shows that a traffic is light in nighttime and congested in daytime, the speed limit of the ADV is adjusted for the ADV to drive faster than the posted speed limit in the nighttime, and speed limit of the ADV is adjusted for the ADV to drive slower than the posted speed limit in the daytime, wherein the adjusted speed limit is broadcast by the dynamic parameter server; and
   operating, by the ADS, the ADV using the one or more identified parameters when the ADV drives across the particular region.

10. The non-transitory machine-readable medium of claim 9, wherein the one or more selection factors includes a map identifier of the HD map, a road ID, a lane ID, or a GPS barrier at the particular region.

11. The non-transitory machine-readable medium of claim 9, wherein the one or more identified parameters include one or more of the one or more obstacles to be trimmed from the ROI, the one or more floating obstacles to be trimmed from the HD map, the speed limit, the slope information, or a weight of a cost function for the ADS.

12. The non-transitory machine-readable medium of claim 9, wherein the dynamic parameter server further sends load information of the ADV to the ADS, which uses the load information to adjust a brake command or a throttle command of the ADV to maintain a same deceleration or acceleration.

13. The non-transitory machine-readable medium of claim 9, wherein the data structure includes a plurality of entries, each entry representing a matching between one or more selection factors and a parameter of the ADS.

14. The non-transitory machine-readable medium of claim 13, wherein the data structure is updated with information from a configuration file at a predetermined location of the particular region in response to the dynamic parameter server being rebooted.

15. The non-transitory machine-readable medium of claim 9, wherein the dynamic parameter server is a separate software module from each autonomous driving module of the ADS, and communicates with the autonomous driving module via an internet hub.

16. The non-transitory machine-readable medium of claim 15, wherein the dynamic parameter server broadcasts each of the one or more identified parameters via the internet hub to each module in the ADS.

17. A data processing system, comprising:
   a processor; and
   a memory coupled to the processor to store instructions for dynamically updating parameters of an autonomous driving system in an autonomous driving vehicle (ADV), which instructions when executed by the processor, cause the processor to perform operations, the operations including
      determining, by a dynamic parameter server in the ADV, that the ADV is to enter a particular region on a high definition (HD) map, wherein the ADV includes an autonomous driving system (ADS) with a plurality of modules, each module having one or more default parameters,
      identifying, by the dynamic parameter server, one or more parameters from a data structure based on one or more selection factors related to the particular region, each identified parameter corresponding to a default parameter of one of the plurality of modules of the ADS,
      sending, by the dynamic parameter server, the one or more identified parameters to one or more modules of the ADS to update the one or more default parameters of the ADS with the one or more identified parameters, wherein the one or more default parameters of the ADS include a first default parameter representing slope information of the particular region on the HD map, wherein the one or more default parameters of the ADS include a second default parameter representing one or more obstacles that need to be trimmed from a region of interest (ROI), wherein the one or more default parameters of the ADS include a third default parameter representing one or more floating obstacles that need to be trimmed from the HD map, wherein the one or more default parameters of the ADS include a fourth default parameter representing a posted speed limit on a roadside, wherein a speed limit of the ADV is adjusted based on driving experience and the posted speed limit, wherein when the driving experience shows that a traffic is light in nighttime and congested in daytime, the speed limit of the ADV is adjusted to make the ADV drive faster than the posted speed limit in the nighttime, and the speed limit of the ADV is adjusted for the ADV to drive slower than the posted speed limit in the daytime, wherein the adjusted speed limit is broadcast by the dynamic parameter server and operating, by the ADS, the ADV using the one or more identified parameters when the ADV drives across the particular region.

18. The system of claim 17, wherein the one or more selection factors includes a map identifier of the HD map, a road ID, a lane ID, or a GPS barrier at the particular region.

19. The system of claim 17, wherein the one or more identified parameters include one or more of the one or more obstacles to be trimmed from the ROI, the one or more floating obstacles to be trimmed from the HD map, the speed limit, the slope information, or a weight of a cost function for the ADS.

20. The system of claim 17, wherein the dynamic parameter server further sends load information of the ADV to the ADS, which uses the load information to adjust a brake command or a throttle command of the ADV to maintain a same deceleration or acceleration.

\* \* \* \* \*